(12) United States Patent
Morisawa et al.

(10) Patent No.: US 11,535,468 B2
(45) Date of Patent: Dec. 27, 2022

(54) RECORDING APPARATUS

(71) Applicant: SEIKO EPSON CORPORATION, Tokyo (JP)

(72) Inventors: Ryoichi Morisawa, Nagano (JP); Takashi Matsuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 118 days.

(21) Appl. No.: 17/061,666

(22) Filed: Oct. 2, 2020

(65) Prior Publication Data

US 2021/0101765 A1    Apr. 8, 2021

(30) Foreign Application Priority Data

Oct. 2, 2019   (JP) .............. JP2019-181962

(51) Int. Cl.
| | |
|---|---|
| *B65H 3/06* | (2006.01) |
| *B65H 1/12* | (2006.01) |
| *B41J 2/01* | (2006.01) |
| *B41J 11/00* | (2006.01) |
| *B41J 29/38* | (2006.01) |
| *B65H 5/06* | (2006.01) |

(52) U.S. Cl.
CPC .............. *B65H 3/0661* (2013.01); *B41J 2/01* (2013.01); *B41J 11/007* (2013.01); *B41J 29/38* (2013.01); *B65H 1/12* (2013.01); *B65H 3/06* (2013.01); *B65H 5/06* (2013.01); *B65H 2402/32* (2013.01); *B65H 2402/441* (2013.01); *B65H 2402/45* (2013.01); *B65H 2402/54* (2013.01); *B65H 2405/115* (2013.01); *B65H 2405/33* (2013.01); *B65H 2407/21* (2013.01)

(58) Field of Classification Search
CPC .............. B65H 3/0661; B65H 2402/32; B65H 2402/441; B65H 2402/45; B65H 2402/54; B65H 2405/115; B65H 2405/12; B65H 2407/21; B65H 2601/325
See application file for complete search history.

(56) References Cited

U.S. PATENT DOCUMENTS

| | | | | |
|---|---|---|---|---|
| 8,991,811 | B1 * | 3/2015 | Iljima | B65H 1/04 271/162 |
| 10,233,040 | B2 * | 3/2019 | Ozeki | B41J 29/13 |

(Continued)

FOREIGN PATENT DOCUMENTS

JP    2015066789 A    4/2015

*Primary Examiner* — Prasad V Gokhale
(74) *Attorney, Agent, or Firm* — Chip Law Group

(57) ABSTRACT

A recording apparatus includes a sheet feeding device including a sheet feed tray on which a medium is mounted in an inclined orientation, a feeding roller configured to feed the medium, and a sheet feed slot that is defined by the sheet feed tray and the feeding roller i, and a recording section configured to perform recording onto the medium fed from the sheet feeding device. The recording apparatus includes a scanner unit that is disposed on a body of the recording apparatus and functions as a reading device for reading a document, and a guiding member that is inclined from a side surface of a guiding member installation section that is a side surface of the scanner unit on a sheet feed tray side in a state in which the scanner unit is closed with respect to the body of the recording apparatus.

6 Claims, 10 Drawing Sheets

(56) References Cited

U.S. PATENT DOCUMENTS

| | | | | |
|---|---|---|---|---|
| 2011/0049791 A1* | 3/2011 | Osakabe | ............ | B65H 1/04 |
| | | | | 271/226 |
| 2014/0291917 A1* | 10/2014 | Uchino | ............ | B65H 3/0653 |
| | | | | 271/147 |
| 2018/0034986 A1* | 2/2018 | Ishida | ............ | H04N 1/00525 |
| 2018/0281485 A1* | 10/2018 | Ozeki | ............ | B41J 13/103 |

* cited by examiner

RECORDING APPARATUS

The present application is based on, and claims priority from JP Application Serial Number 2019-181962, filed Oct. 2, 2019, the disclosure of which is hereby incorporated by reference herein in its entirety.

BACKGROUND

1. Technical Field

The present disclosure relates to a recording apparatus.

2. Related Art

Recording apparatuses that discharge a liquid onto a medium for recording are known. Such example recording apparatuses include multifunction peripherals that has a printer unit in a lower part and a scanner unit in an upper part. Some of the recording apparatuses include a detachable/attachable sheet feed tray on an apparatus front side, and a rear-side sheet feed tray on an apparatus rear side, on the rear-side sheet feed tray paper can be manually set in an inclined orientation. Such a rear-side sheet feed tray, for example, as disclosed in JP-A-2015-66789, extends upward in an inclined manner from the rear side of the recording apparatus, and supports a plurality of paper sheets on its upper surface.

In the multifunction peripheral discussed in JP-A-2015-66789, however, in some cases, paper is not readily set. For example, when the user sets paper sheets onto the rear-side sheet feed tray from the front side of the multifunction peripheral, the user cannot see the sheet feed slot and other parts of the rear-side sheet feed tray, and the paper sheets come into contact with a structural part between the apparatus rear side and the rear-side sheet feed tray. As a result, the paper sheets may be set in an unintended position.

SUMMARY

A recording apparatus includes a sheet feeding device including a sheet feed tray on which a medium is mounted in an inclined orientation, a feeding roller configured to feed the medium, and a sheet feed slot that is defined by the sheet feed tray and the feeding roller and into which the medium is set, and a recording section configured to perform recording onto the medium fed from the sheet feeding device. The recording apparatus includes a reading device disposed on a body of the recording apparatus, the reading device being configured to read a document and to expose the inside of the recording apparatus, and a guiding member having an inclined surface inclined downward below a horizontal plane toward the sheet feed tray from a side surface of the reading device on the sheet feed tray side in a state in which the reading device is closed with respect to a body of the recording apparatus.

In the recording apparatus, the guiding member may include a rectangular guiding plate having a dimension that is substantially the same as a width of the sheet feed slot in a width direction in which the sheet feed slot extends, first rotating shafts formed at both end portions in the width direction on a lower side of the guiding plate, the first rotating shafts having an axis direction in the width direction, and slide shafts formed at the end portions on an upper side, the slide shafts having an axis in the width direction. The recording apparatus may further include slide guide portions configured to slide the slide shafts in a vertical direction, the slide guide portions formed in a side surface of the reading device on the sheet feed tray side, and the guiding member is configured to rotate about the first rotating shafts and the slide shafts slide along the slide guide portions to move to a retracted position in synchronization with an operation of opening the reading device and move to a guiding position in which the inclined surface is positioned toward the sheet feed tray in synchronization with a closing operation.

The recording apparatus may further include a roller shaft extending in the width direction to pivotally support the feeding roller to rotate the feeding roller, and a cover member extending in the width direction to cover the roller shaft, in which the guiding member may further include a second rotating shaft that is coaxial with the first rotating shafts formed at the end portions of the guiding plate in the width direction and is disposed between the first rotating shafts, and the cover member may include first shaft supporting portions that pivotally support the first rotating shafts and a second shaft supporting portion that pivotally supports the second rotating shaft.

In the recording apparatus, an insertion portion into which the medium is inserted may be defined between the sheet feed tray and a lower end portion of the guiding plate.

The recording apparatus may further include a catcher configured to prevent an object that is mounted on an upper surface of the reading device from entering the sheet feeding device, the catcher being disposed on the sheet feed tray side of the reading device, in which the catcher may include a receiving member that extends in the width direction and receives the object, an auxiliary member that is turnably coupled to the receiving member, protrudes in a height direction with respect to the upper surface of the reading device, and assists the receiving member in catching the object, and a spring member that urges the auxiliary member with respect to the receiving member in a direction to open the auxiliary member.

The recording apparatus may further include a tray cover configured to be turned with respect to the body of the recording apparatus to cause the sheet feed tray to be turned together with the tray cover to cover the sheet feed slot, in which the auxiliary member may include a pair of rotating shafts that has an axis direction in the width direction with respect to the receiving member, the receiving member may include a pair of shaft supporting portions that pivotally support the pair of rotating shafts, the spring member may extend between the auxiliary member and the receiving member about one of the rotating shafts, and when the sheet feed tray is turned as the tray cover is turned to cover the sheet feed slot, the auxiliary member may come into contact with the turning tray cover, and may be turned against the urging force of the spring member toward the receiving member side.

DESCRIPTION OF EXEMPLARY EMBODIMENTS

1. Embodiment

Figure 1:
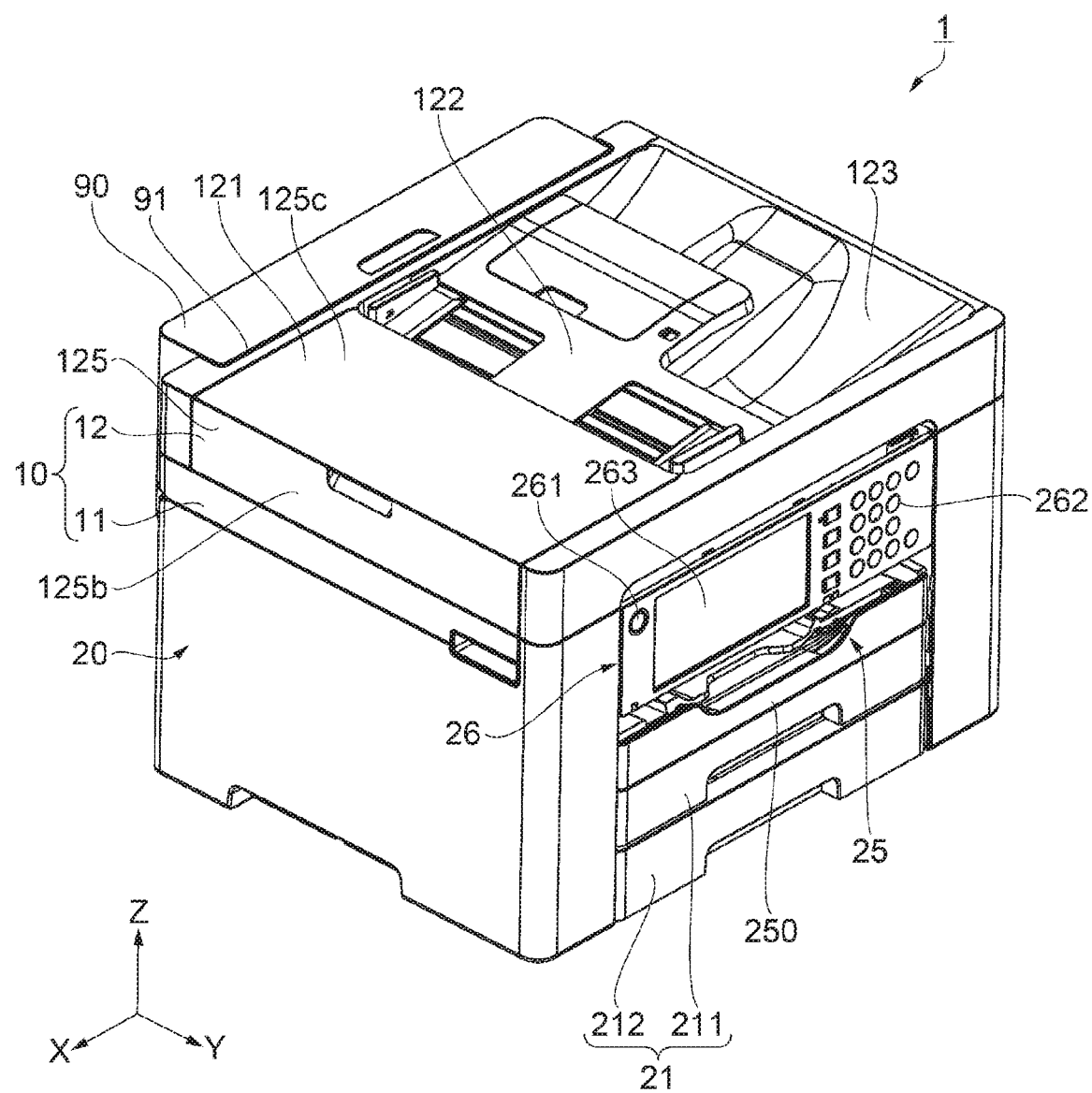
FIG. 1 is a perspective view of a recording apparatus according to an embodiment.
Figure 2:
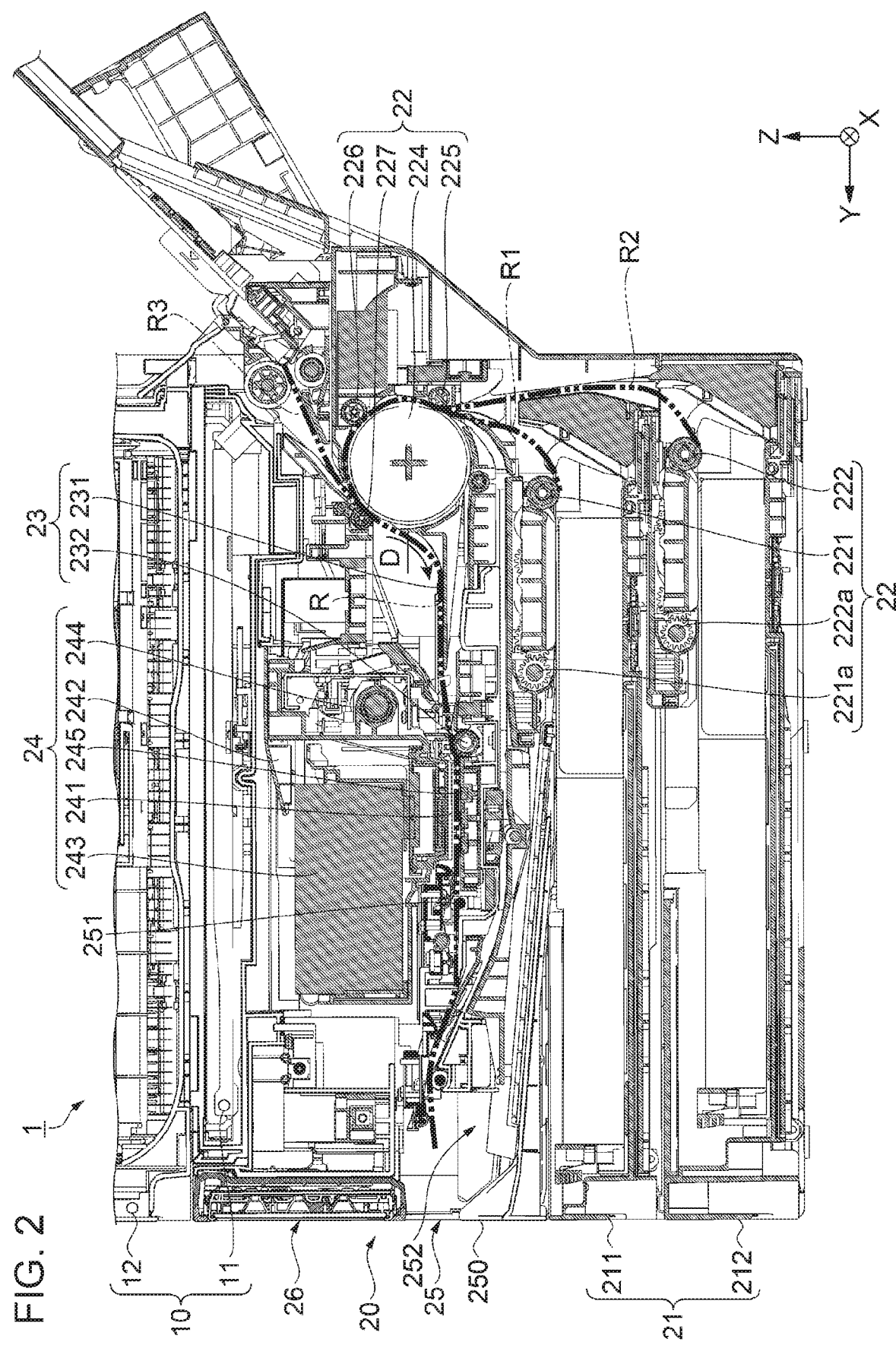
FIG. 2 is a cross-sectional view illustrating a schematic structure of a recording unit and components around the recording unit in a recording apparatus.
Figure 3:
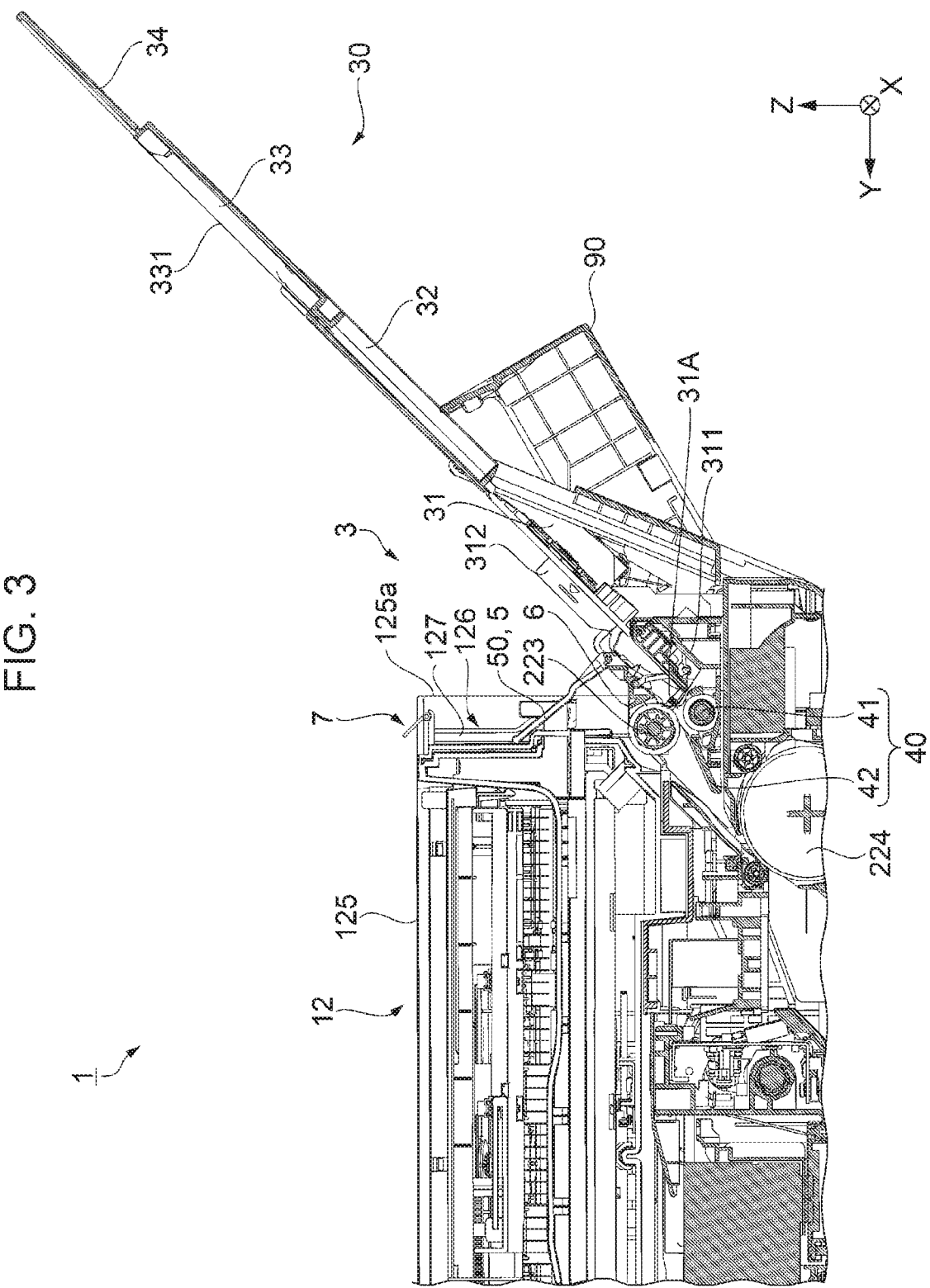
FIG. 3 is a cross-sectional view illustrating a schematic structure of a sheet feed tray and components around the sheet feed tray in a recording apparatus.
Figure 4:
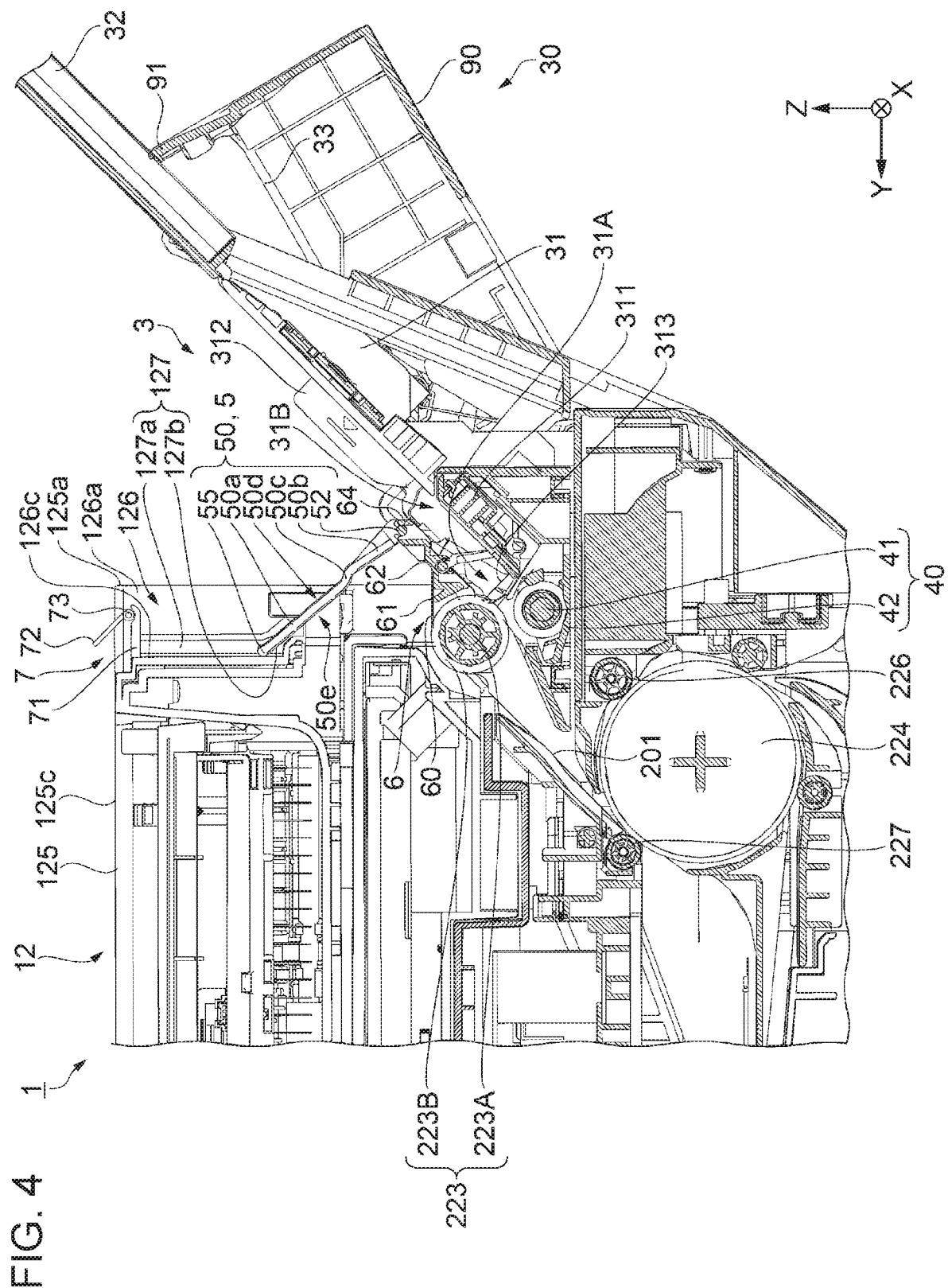
FIG. 4 is a cross-sectional view illustrating a schematic structure of a third feeding roller and components around the third feeding roller in a recording apparatus.

An outline of a recording apparatus according to an embodiment will be described. An ink jet recording apparatus (hereinafter, referred to as recording apparatus 1) will be described as an example recording apparatus. FIG. 1 is a perspective view of the recording apparatus 1 according to the embodiment. FIG. 2 is a cross-sectional view illustrating a schematic structure of a recording unit 20 and components around the recording unit 20 in the recording apparatus 1. FIG. 3 is a cross-sectional view illustrating a schematic structure of a sheet feed tray 30 and components around the sheet feed tray 30 in the recording apparatus 1. FIG. 4 is a cross-sectional view illustrating a schematic structure of a third feeding roller 223 and components around the third feeding roller 223 in the recording apparatus 1.

In each drawing, an XYZ coordinate system is employed. An X direction denotes a width direction in a sheet S that is a medium to be recorded, and is a scanning direction of a recording head 241. A Y direction denotes a depth direction in the recording apparatus 1 and is a length direction in the sheet S. A Z direction denotes the direction of gravity, and is a height direction in the recording apparatus 1.

In addition, a +Y-direction side of the recording apparatus 1 denotes a front side or a front surface side, and a −Y-direction side of the recording apparatus 1 denotes a rear side or a rear surface side. When the recording apparatus 1 is viewed from the front side, a +X-direction side denotes a left side of the recording apparatus 1, a +X direction denotes a left direction, a −X-direction side denotes a right side of the recording apparatus 1, and a −X direction denotes a right direction. A +Z-direction side denotes an upper side (including above, on, upper surface) of the recording apparatus 1, and a −Z-direction denotes a lower side (including below, under, lower surface) of the recording apparatus 1.

In the description below, "downstream" denotes a side toward which a sheet S is transported in the recording apparatus 1. In addition, "upstream" denotes a side from which a sheet S is transported, and is a direction opposite to downstream.

With reference to FIG. 1 and FIG. 2, an overview of the recording apparatus 1 will be described. As illustrated in FIG. 1, the recording apparatus 1 includes the recording unit 20, and a scanner unit 10 that is disposed on the recording unit 20 and serves as a reading device. In other words, the reading device is disposed on a body of the recording apparatus 1. The recording apparatus 1 is a so-called multifunction peripheral.

The scanner unit 10 includes a first reading device 11 and a second reading device 12 that is disposed on the first reading device 11. The first reading device 11 is a flatbed scanner, and includes a contact image sensor (not illustrated). The user opens the second reading device 12 with respect to the first reading device 11 to expose a document mounting surface (not illustrated) that is an upper surface of the first reading device 11. The user then mounts a document to be read on the exposed document mounting surface of the first reading device 11 and closes the second reading device 12, and performs a predetermined switch operation from an operation section 26. According to the operation, the first reading device 11 reads characters, symbols, drawings, and the like on the document that is mounted on the document mounting surface as an image, and converts the image into image data.

The second reading device 12 includes a document supplying unit 121. The document supplying unit 121 supplies a document that is mounted on a document mounting tray 122 into the second reading device 12. The second reading device 12 includes an auto document feeder (ADF), and reads the supplied document as an image and discharges the read document onto a document discharge tray 123.

On the front side of the recording apparatus 1, the operation section 26 that is used to operate the recording apparatus 1 is provided. The operation section 26 is a panel that is long in the X direction, and includes a power button 261 that is operated to turn on or off the recording apparatus 1, operation buttons 262 that are operated to input various kinds of information, and a display panel 263 that can display an operation state. The display panel 263 may be, for example, a liquid crystal panel.

A paper cassette 21 is detachably attached to a lower part of the recording apparatus 1. The paper cassette 21 is a container that can store sheets S in a stacked state. The paper cassette 21 according to the embodiment includes a paper cassette 211 that stores A4-size sheets S, and a paper cassette 212 that stores A3-size sheets S.

As illustrated in FIG. 2, the recording unit 20 has a transport route R that is indicated by chain double-dashed line, and a sheet S is transported in a transport direction D. The recording unit 20 includes, in the recording unit 20, the paper cassette 21, a sheet feeding section 22, a transport section 23, a recording section 24, a discharge section 25, and a controller (not illustrated). The recording unit 20 includes a sheet feeding device 3 that is disposed on the rear side. The user can supply a sheet S by using the sheet feeding device 3. Example sheets S that can be mounted (supplied) on the sheet feeding device 3 (sheet feed tray 30 described below) include sheets S of A4 size, A3 size, and A3 plus.

The sheet feeding section 22 feeds sheets S that are stored in the paper cassette 21 to the transport section 23. The sheet feeding section 22 includes pickup rollers for feeding an uppermost sheet S of the sheets S that are stored in the paper cassette 21 in a stacked state; a first feeding roller 221 for the paper cassette 211 and a second feeding roller 222 for the paper cassette 212. The first feeding roller 221 can pivot around a first pivot shaft 221a, and the second feeding roller 222 can pivot around a second pivot shaft 222a. The first feeding roller 221 and the second feeding roller 222 come into contact with respective uppermost sheets S of the sheets S in the paper cassettes 211 and 212.

The sheet feeding section 22 includes the first feeding roller 221, and an intermediate roller 224 that is disposed downstream of the second feeding roller 222. Along an outer periphery of the intermediate roller 224, from upstream, a first driven roller 225, a second driven roller 226, and a third driven roller 227 are disposed, and the rollers rotate to follow the rotation of the intermediate roller 224 that is driven by a feeding motor (not illustrated).

The first feeding roller 221 and the intermediate roller 224 are driven by respective feeding motors (not illustrated), and then sheets S are fed from the paper cassette 211 one by one. The sheet S is fed from the paper cassette 211 toward the apparatus rear side (−Y direction) by the first feeding roller 221, and sequentially nipped and bent by the intermediate roller 224, which is driven by the drive motor (not illustrated), the first driven roller 225, the second driven roller 226, and the third driven roller 227 toward the apparatus front side (+Y direction). Similarly to the sheet S that is stored in the paper cassette 211, the sheet S that is stored in the paper cassette 212 is fed toward the apparatus rear side by the second feeding roller 222, and sequentially nipped and bent by the intermediate roller 224, the first driven roller 225, the second driven roller 226, and the third driven roller 227 toward the apparatus front side.

The transport route R for sheets S is indicated by chain double-dashed line. The transport route R for sheets S fed from the paper cassette 211 is a transport route R1, and the transport route R for sheets S fed from the paper cassette 212 is a transport route R2, and the transport routes R1 and R2 merge at a point before (upstream) the nip position of the intermediate roller 224 and the first driven roller 225.

The transport section 23 transports the fed sheet S toward the recording section 24. The transport section 23 includes a transport guide member 231 that guides a sheet S and a transport roller pair 232 that is rotated as a transport motor (not illustrated) is driven. The transport guide member 231 is disposed downstream, at a position close to the nip position of the intermediate roller 224 and the third driven roller 227. The transport guide member 231 guides the sheet S that is transported by the intermediate roller 224 and the third driven roller 227 toward the transport roller pair 232. The transport roller pair 232 is disposed downstream of the transport guide member 231, and nips and transports the transported sheet S toward a platen 245.

The recording section 24 includes the recording head 241, a carriage 242, and an ink cartridge 243. The recording head 241 discharges an ink onto a sheet S. The carriage 242 can be moved with the recording head 241 mounted thereon in a scanning direction that is a width direction that intersects the transport direction D of the sheet S. The ink cartridge 243 supplies an ink to the recording head 241. The recording section 24 includes a guide shaft 244 that supports the carriage 242 such that the carriage 242 can be reciprocated in the scanning direction (width direction). The recording section 24 includes the platen 245 at a position facing the recording head 241 across the transport route R. The sheet S that is transported by the transport roller pair 232 is transported to a support surface (upper surface) of the platen 245 in a sucked state.

The recording section 24 discharges an ink from the recording head 241 in accordance with recording data (print data) onto the sheet S that is transported while being supported by the platen 245 to cause the ink to adhere to the sheet S to form an image in accordance with the recording data, and thereby performing recording (printing). The recording data is generated based on image data such as text data or image data to be recorded on a sheet S to cause the recording apparatus 1 to perform recording. The recorded sheet S is transported by the transport section 23 and is transported to the discharge section 25 that is disposed downstream of the recording head 241 in the transport direction D.

The discharge section 25 includes a discharge tray 250 and a discharge roller pair 251. When the sheet S is discharged, the discharge tray 250 is set by extending the discharge tray 250 from the body of the recording unit 20 toward the apparatus front side. The discharge tray 250 nips the recorded sheet S with the discharge roller pair 251 and discharges the sheet S from a discharge slot 252 onto the discharge tray 250. Sheets S that are sequentially recorded and discharged are sequentially stacked on their respective previously discharged sheets S.

The controller (not illustrated) performs drive control of the sheet feeding section 22, the transport section 23, the recording section 24, the discharge section 25, and the like. The controller performs overall control as the recording apparatus 1 in cooperation with a scanner controller (not illustrated) in the scanner unit 10. The recording apparatus 1 according to the embodiment includes a mechanism for reversing sheets S to enable two-sided printing.

Next, the sheet feeding device 3 according to the embodiment will be described. The sheet feeding device 3 according to the embodiment includes, as illustrated in FIG. 3 and FIG. 4, the sheet feed tray 30 and the third feeding roller 223. On the sheet feed tray 30, sheets S are mounted in an inclined orientation. The third feeding roller 223 functions as a feeding roller for feeding the sheets S that are mounted on the sheet feed tray 30 toward the intermediate roller 224. The sheet feeding device 3 includes a sheet feed slot 31A and a separation section 40. The sheet feed slot 31A is a space defined by the sheet feed tray 30 and the third feeding roller 223, and sheets S are set into the sheet feed slot 31A. The separation section 40 is disposed to face the third feeding roller 223 and separates sheets S, that is, prevents multi-sheet feeding.

The sheet feed tray 30 has, as illustrated in FIG. 3, a substantially plate-like shape, and includes a first support section 31, a second support section 32 and a third support section 33 that are slidably accommodated on the rear surface side of the first support section 31 in parallel with the surface of the first support section 31 on which sheets S are mounted, and a fourth support section 34 that is extended at an upper end portion of the third support section 33 with a hinge (not illustrated) that is provided to the third support section 33.

To use the sheet feed tray 30, as illustrated in FIG. 3 and FIG. 4, a tray cover 90 that covers the sheet feed tray 30 is turned toward the rear side from a state (see FIG. 10) in which the tray cover 90 covers the first support section 31 that accommodates from the second support section 32 to the fourth support section 34 such that the first support section 31 is positioned at a predetermined angle to support sheets S in an inclined orientation. Then, the second support section 32 and the third support section 33 are sequentially extended upward in an inclined manner in parallel with the first support section 31 on the rear side. The fourth support section 34 is turned and extended with respect to the third support section 33.

When the sheet feed tray 30 is not used, the fourth support section 34 is turned and folded back onto an upper surface 331 of the third support section 33 with the hinge, and thereby the fourth support section 34 is accommodated. Then, the third support section 33 is parallelly pushed into the second support section 32 and thereby the third support section 33 can be accommodated. Furthermore, the second support section 32 is parallelly pushed into the first support section 31 and thereby the second support section 32 to the fourth support section 34 can be accommodated into the first support section 31. The tray cover 90 is turned forward to cover and accommodate the first support section 31 with the tray cover 90.

The first support section 31 has a substantially plate-like shape, and includes a hopper 311 that can pivot about a pivot (not illustrated). The first support section 31 includes edge guides 312 that are disposed on the right and left sides to position both edges of mounted sheets S in the width direction.

When sheets S are mounted, the hopper 311 pivots and is switched to a pressure-contact position for allowing the supported sheets S to be pressed to come into contact with the third feeding roller 223 or a separation position for separating the sheets S from the third feeding roller 223. As illustrated in FIG. 4, the hopper 311 includes, in a lower part, a lower edge support section 313 that has a plane in the width direction and supports lower edges of the mounted sheets S. The lower edge support section 313 determines a position of the mounted sheets S in the length direction.

As illustrated in FIG. 4, the separation section 40 includes a separation roller 41 and a separation roller holder 42. The separation roller 41 is disposed to come into contact with the third feeding roller 223 and receives predetermined rotational resistance. The separation roller holder 42 pivotally supports the separation roller 41 and can pivot about a pivot (not illustrated). In addition, the separation section 40 includes an urging member (not illustrated) that urges the separation roller holder 42 in the pivoting direction such that the separation roller 41 comes into contact with the third feeding roller 223.

When the hopper 311 is in the pressure-contact position and lower edges of the sheets S that are supported by the lower edge support section 313 are pressed toward the sheet feed slot 31A and the sheets S are slid into the sheet feed slot 31A, in a case in which no sheets S exist or only one sheet S exists between the third feeding roller 223 and the separation roller 41, the separation roller 41 rotates with respect to the third feeding roller 223. On the other hand, when two or more sheets S exist between the third feeding roller 223 and the separation roller 41, the separation roller 41 does not rotate with respect to the third feeding roller 223. The above-described operation of the separation roller 41 enables the lower edges of the second sheet S and sheets S after the second sheet S that are being fed together with the target uppermost sheet S to be fed to stay at the separation roller 41, and thereby multi-sheet feeding of the sheets S can be prevented and the sheets S are appropriately fed one by one toward the intermediate roller 224.

As illustrated in FIG. 2, the transport route R for sheets S to be fed by the third feeding roller 223 and the separation roller 41 is a transport route R3, and the transport route R3 merges at a point before (upstream) the nip position of the intermediate roller 224 and the third driven roller 227.

Figure 5:
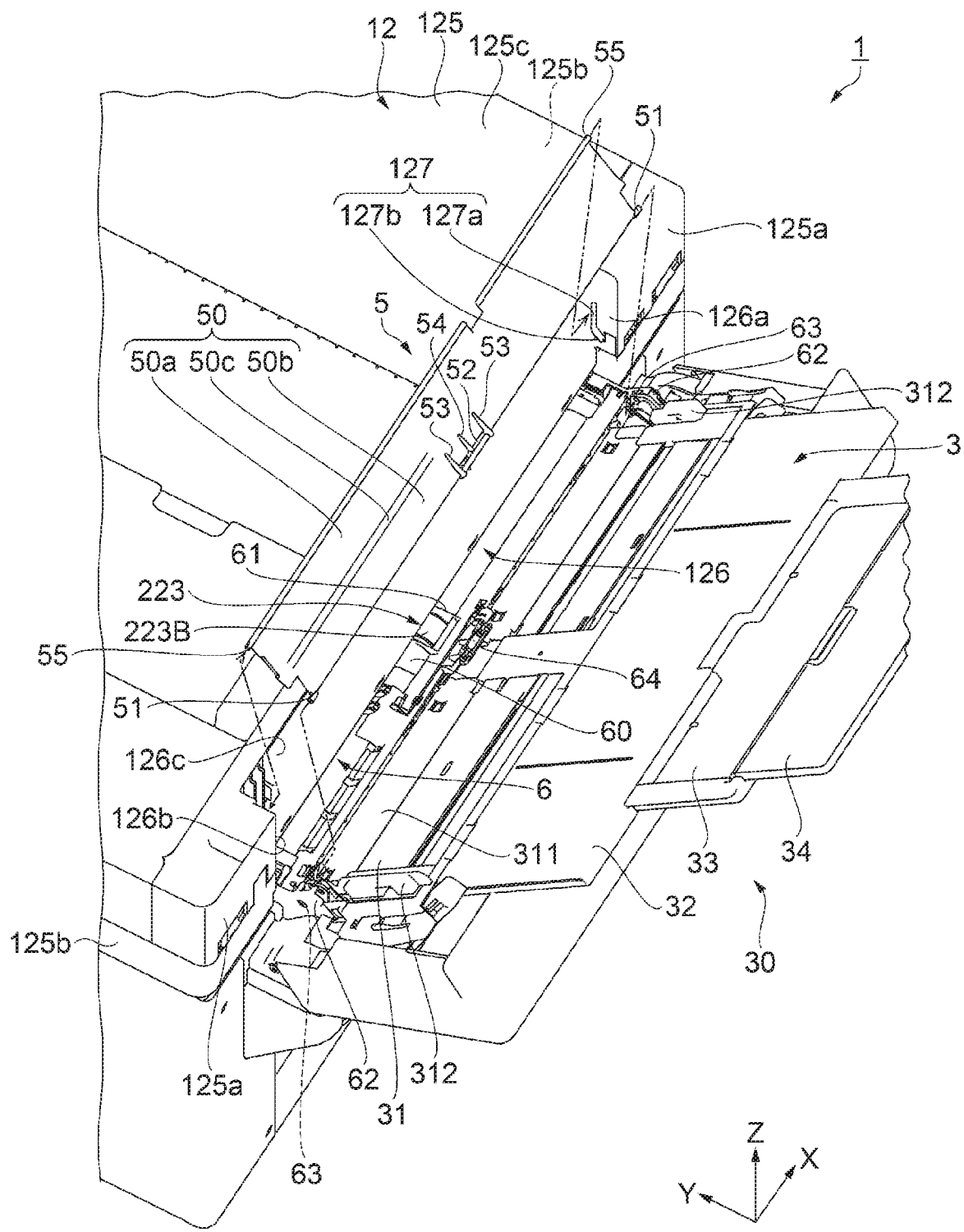
FIG. 5 is an exploded perspective view illustrating a guiding member.
Figure 6:
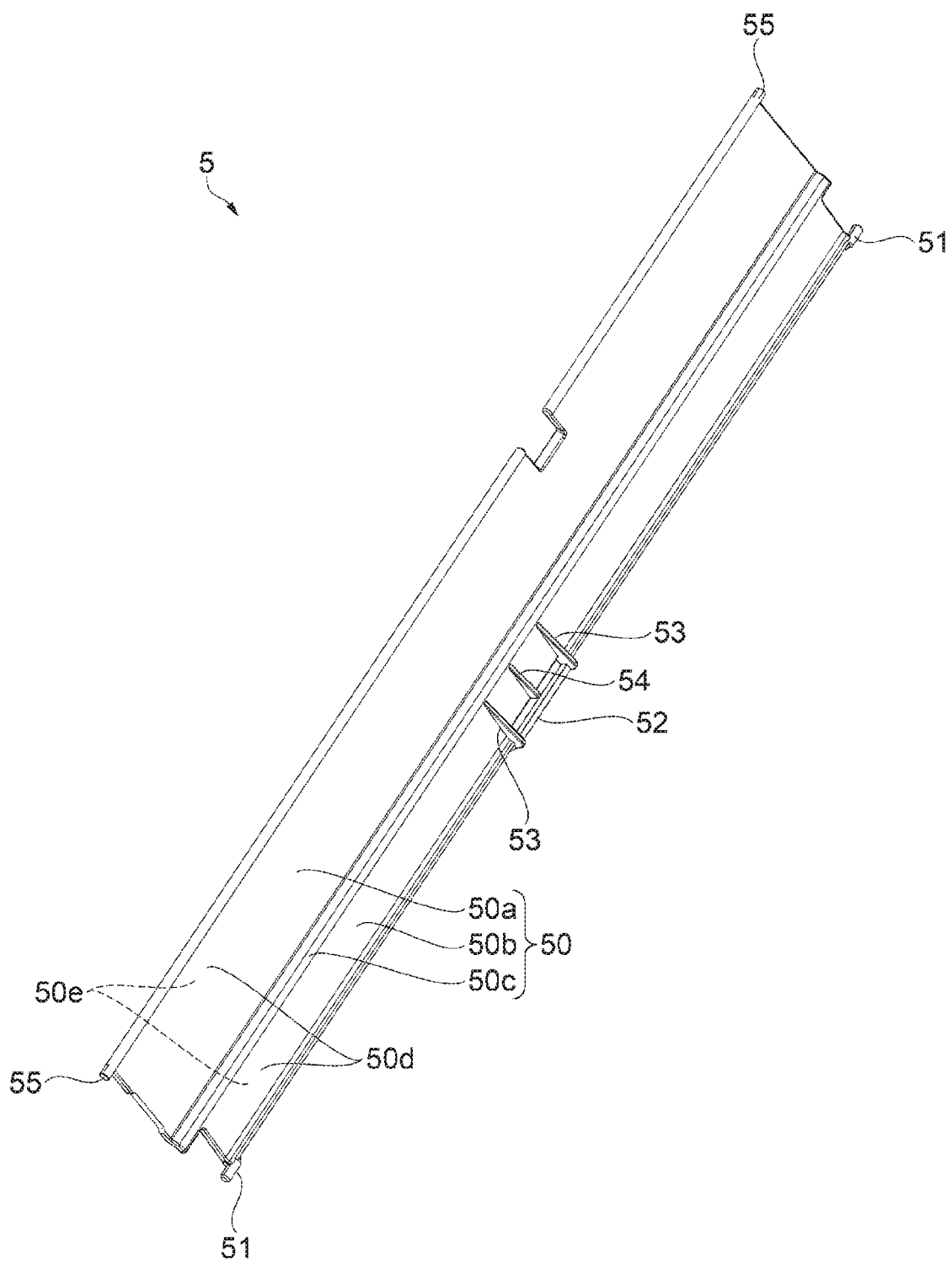
FIG. 6 is a perspective view illustrating a guiding member.

The above-described FIG. 4 is also a cross-sectional view illustrating a guiding member 5 according to the embodiment. FIG. 4 illustrates a normal state when the sheet feeding device 3 is used, and in this state, the scanner unit 10 is in a closed state. FIG. 5 is an exploded perspective view illustrating the guiding member 5. In FIG. 5, a catcher 7, which will be described below, is omitted. FIG. 6 is a perspective view illustrating the guiding member 5. More specifically, FIG. 6 is an exploded perspective view illustrating the guiding member 5 viewed from the rear surface side. With reference to FIG. 4 to FIG. 6, the guiding member 5 will be described.

The guiding member 5 according to the embodiment is a plate-shaped guiding plate 50. The guiding plate 50 has a dimension that is substantially the same as the width of the sheet feed slot 31A in the width direction in which the sheet feed slot 31A extends, and has a rectangular shape. In other words, the dimension of the guiding plate 50 in the width direction is wider than or equal to the width of a sheet S. In the guiding plate 50, a long-side direction is the width direction, and a short-side direction is the height direction. The guiding plate 50 is bent in an approximately central portion in the height direction across the width direction. A plate-shaped area on the upper side of the bent portion is an upper guiding portion 50a, a plate-shaped area on the lower side of the bent portion is a lower guiding portion 50b, and the bent area is a bent portion 50c.

At both end portions in the width direction on the lower side of the lower guiding portion 50b, first rotating shafts 51 that are coaxial and protrude in the width direction are provided. The first rotating shafts 51 are slightly closer to the rear surface side than a surface (rear surface 50d described below) of the lower guiding portion 50b on the rear surface side. Hereinafter, a surface of the guiding plate 50 on the rear surface side that includes the upper guiding portion 50a, the bent portion 50c, and the lower guiding portion 50b is referred to as the rear surface 50d, and a surface of the guiding plate 50 on the front surface side that includes the upper guiding portion 50a, the bent portion 50c, and the lower guiding portion 50b is referred to as a front surface 50e.

On the lower side of the lower guiding portion 50b, a second rotating shaft 52 that is coaxial with the first rotating shafts 51 and is disposed between the first rotating shafts 51 is provided. The second rotating shaft 52 is in a central portion of the lower guiding portion 50b in the width direction. Both end portions of the second rotating shaft 52 in the axis direction are supported by rotating shaft support sections 53 that are tapered in side view, and are separated from the rear surface 50d of the lower guiding portion 50b. Between the rotating shaft support sections 53, an auxiliary support section 54 that is similarly tapered is provided. At both end portions in the width direction on the upper side of the upper guiding portion 50a, slide shafts 55 that are coaxial in the width direction are provided.

The third feeding roller 223 is pivotally supported by a roller shaft 223A. The roller shaft 223A extends in the width direction to rotate the third feeding roller 223. More specifically, the roller shaft 223A extends in the width direction of a body frame 201 in the recording unit 20, and is rotated by the rotation of a drive motor (not illustrated) that is disposed in the recording unit 20.

The third feeding roller 223 has a roller section 223B that is disposed around the outer periphery of a central portion of the roller shaft 223A. The roller section 223B has a tubular rubber member and an annular rubber supporting section that is fitted into the roller shaft 223A to support the rubber member. The third feeding roller 223 that has such a structure feeds sheets S toward the intermediate roller 224 by the rotation of the roller section 223B as the roller shaft 223A rotates.

A cover member 6 is disposed to cover the roller shaft 223A. The cover member 6 extends in the width direction of the body frame 201 of the recording unit 20 to cover the upper side and the rear surface side of the roller shaft 223A. As illustrated in FIG. 5, the cover member 6 includes a cover body 60 that covers the upper side and the rear surface side of the roller shaft 223A. The cover body 60 has an opening 61 in a central part of the cover body 60 in the width direction at a position corresponding to the third feeding roller 223. Through the opening 61, the third feeding roller 223 is exposed.

The cover member 6 has protrusions 62 that extend toward the rear surface side from both end portions in the width direction of the cover body 60. On respective facing inner surfaces of the pair of protrusions 62, first shaft supporting portions 63 that pivotally support the first rotating shafts 51 of the guiding plate 50 are formed. In a central part of the cover body 60 in the width direction, on the rear surface side of the opening 61, a second shaft supporting portion 64 that pivotally supports the second rotating shaft 52 of the guiding plate 50 is formed.

On a rear surface 125a of an outer case 125 of the second reading device 12, a guiding member installation section 126 that extends inside from a side surface 125b in the left-right direction and extends toward the front surface side in an area facing the sheet feed tray 30 and has a substantially concave shape with respect to the rear surface 125a in top view is formed. In side surfaces of the guiding member installation section 126 in the left-right direction, the side surface on the left-direction side (+X-direction side) is a side surface 126a, the side surface on the right-direction side (−X direction side) is a side surface 126b, and a side surface on the front-direction side (+Y-direction side) is a side surface 126c.

In the left side surface 126a and the right side surface 126b of the guiding member installation section 126, respective slide guide portions 127 that allow the slide shafts 55 of the guiding plate 50 to slide are formed in the vertical direction (Z direction). The groove-shaped slide guide portions 127 in the side surfaces 126a and 126b are symmetric with each other. The slide guide portions 127 each have, more specifically, a first slide guide portion 127a that is formed in a groove shape in the Z direction, and a second slide guide portion 127b that is formed in a groove shape inclined downward from a lower portion of the first slide guide portion 127a on the rear surface side.

The installation of the guiding member 5 will be described. The guiding member 5 is installed to the cover member 6 and the side surfaces 126a and 126b of the guiding member installation section 126 in the outer case 125 of the second reading device 12. The two first rotating shafts 51 of the guiding plate 50 are inserted into the corresponding two first shaft supporting portions 63 of the cover member 6 respectively. In the insertion operation, the lower guiding portion 50b of the guiding plate 50 is slightly bent to enable the guiding plate 50 to be inserted into the first shaft supporting portions 63. In addition, the second rotating shaft 52 of the guiding plate 50 is pressed from above with respect to the corresponding second shaft supporting portion 64 of the cover member 6, and thereby the second rotating shaft 52 engages with the second shaft supporting portion 64.

The slide shafts 55 of the guiding plate 50 are engaged with the slide guide portions 127 of the side surfaces 126a and 126b of the guiding member installation section 126 of the outer case 125. In the insertion operation, the upper guiding portion 50a of the guiding plate 50 is slightly bent to enable the guiding plate 50 to be engaged with the slide guide portions 127. According to the operation, the guiding member 5 is installed to the cover member 6 and the side surfaces 126a and 126b of the outer case 125.

As illustrated in FIG. 4, in the installed guiding member 5, the upper guiding portion 50a of the guiding plate 50 is closer to the front-direction side than the lower guiding portion 50b. As illustrated in FIG. 4, in the installed guiding member 5, the lower end portion of the lower guiding portion 50b, which is a lower end portion of the guiding plate 50, and the sheet feed tray 30 define an insertion portion 31B that is in connection with the sheet feed slot 31A and into which sheets S are inserted.

A state of the guiding member 5 will be described with reference to FIG. 4 in which the guiding member 5 is in a state (closed state) in which the scanner unit 10 is closed with respect to the body (recording unit 20) of the recording apparatus 1, and the sheet feeding device 3 is extended. The state illustrated in FIG. 4 is a normal position for printing to sheets S that are fed from the sheet feeding device 3.

In this state, the slide shafts 55 of the guiding member 5 slide to the lower portions of the first slide guide portions 127a of the slide guide portions 127. This causes the rear surface 50d of the guiding plate 50 of the guiding member 5 to become an inclined surface, and in this state, the rear surface 50d is inclined downward below a horizontal plane toward the sheet feed tray 30 from the side surface 126c of the guiding member installation section 126. It should be noted that the side surface 126c of the guiding member installation section 126 is, with respect to the second reading device 12, a side surface on the sheet feed tray 30 side and is a side surface on the front-direction side (+Y-direction side). In other words, when the scanner unit 10 is closed with respect to the body of the recording apparatus 1, in synchronization with the closing operation of the scanner unit 10, the guiding member 5 moves to a guiding position in which the inclined surface is positioned toward the sheet feed tray 30.

Accordingly, when the user sets sheets S onto the sheet feed tray 30 in a state in which the user cannot see the sheet feed slot 31A, the sheets S come into contact with the rear surface 50d that is the inclined surface of the guiding member 5 that has been moved to the guide position, and are guided along the rear surface 50d toward the sheet feed tray 30. Since the rotating shaft support sections 53, which support the second rotating shaft 52, are tapered, the sheets S that come into contact with the rotating shaft support sections 53 are guided toward the sheet feed tray 30. Furthermore, after the sheets S are guided by the guiding plate 50, the sheets S are inserted via the insertion portion 31B, and thus the user can readily mount the sheets S onto the sheet feed tray 30. As a result, the sheets S are appropriately mounted and set on the sheet feed tray 30.

Figure 7:
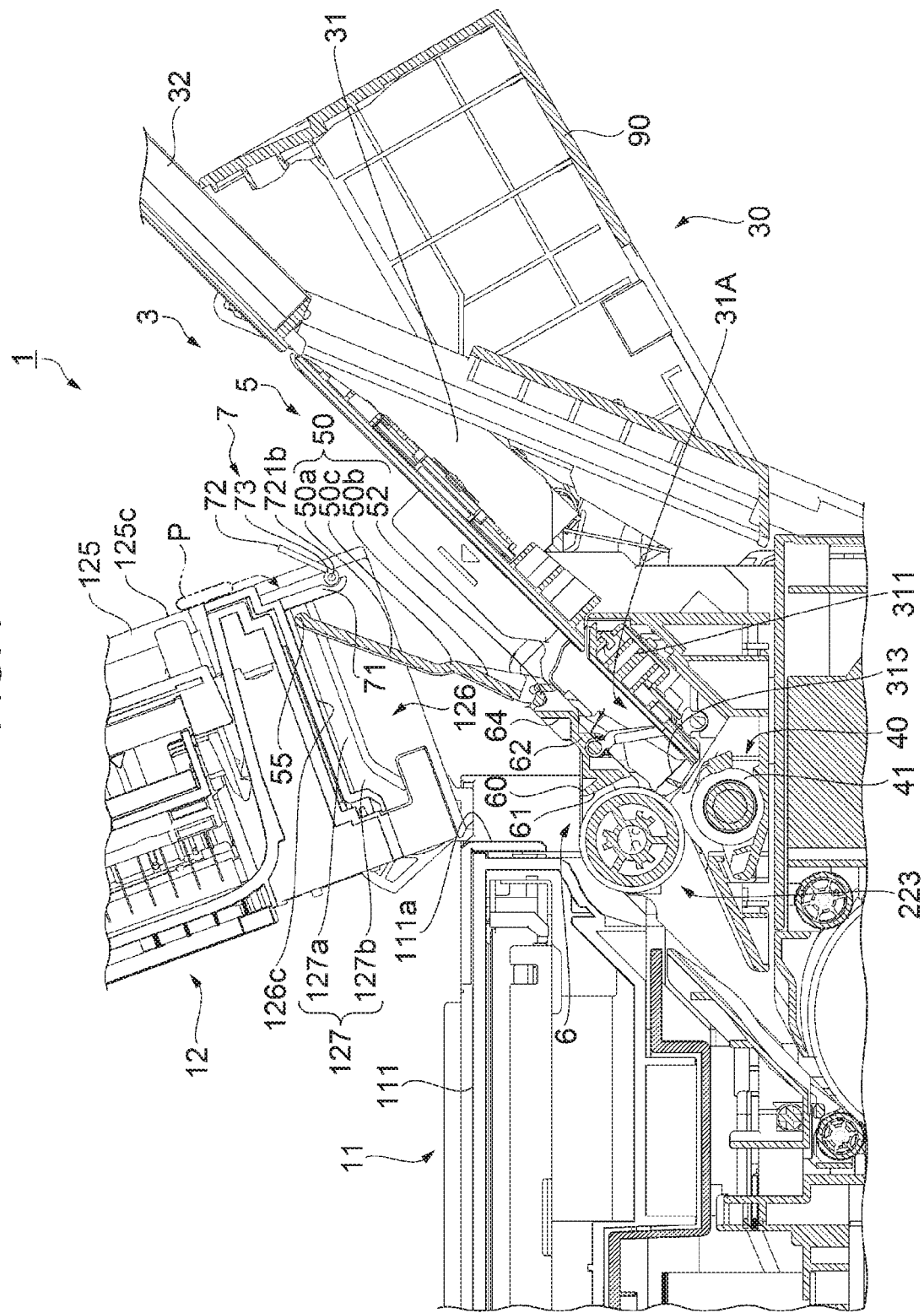
FIG. 7 is a cross-sectional view illustrating a second reading device that is open with respect to a first reading device in a state in which a sheet feeding device is extended.

FIG. 7 is a cross-sectional view illustrating the second reading device 12 that is open with respect to the first reading device 11 in a state in which the sheet feeding device 3 is extended. The state "the second reading device 12 that is open with respect to the first reading device 11" means "the second reading device 12 is open with respect to the body of the recording apparatus 1".

When the first reading device 11 is used, the second reading device 12 is in this state. The second reading device 12 is opened with respect to the first reading device 11 to enable a document to be mounted on the exposed document mounting surface of the first reading device 11, and after the document is mounted, the second reading device 12 is closed, and reading and printing of the document are performed. A state of the guiding member 5 when the second reading device 12 is opened with respect to the first reading device 11 in a state in which the sheet feeding device 3 is extended will be described.

In this state, in synchronization with the opening operation in which the second reading device 12 is opened with respect to the first reading device 11, in the guiding member 5, the first rotating shafts 51 and the second rotating shaft 52 rotate the first shaft supporting portions 63 and the second shaft supporting portion 64 respectively, and the slide shafts 55 slide upward in the slide guide portions 127 to the upper portions of the first slide guide portions 127a. The position to which the guiding member 5 is moved in synchronization with the opening operation in which the second reading device 12 is opened with respect to the first reading device 11 is a retracted position in which the second reading device 12 is opened with respect to the first reading device 11 or the body of the recording apparatus 1. In the retracted position, the guiding member 5 does not interfere with components around the guiding member 5.

Figure 8:
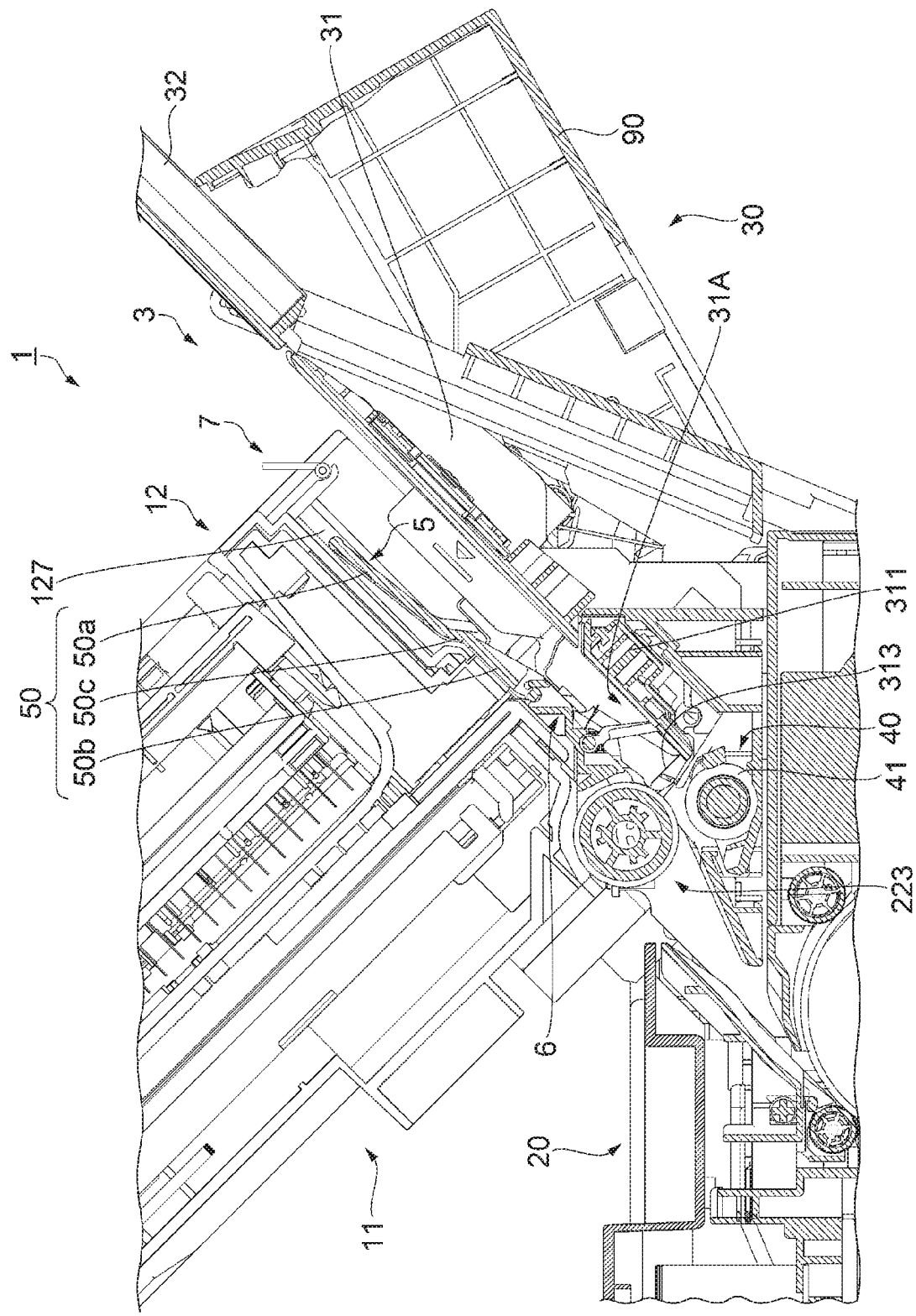
FIG. 8 is a cross-sectional view illustrating the first reading device that is open with respect to a body of the recording apparatus in a state in which the sheet feeding device is extended.

FIG. 8 is a cross-sectional view illustrating the first reading device 11 that is open with respect to the body of the recording apparatus 1 in a state in which the sheet feeding device 3 is extended. A state of the guiding member 5 when the first reading device 11 is opened with respect to the body of the recording apparatus 1 in a state in which the sheet feeding device 3 is extended will be described. When the first reading device 11 is opened with respect to the body of the recording apparatus 1, in synchronization with the operation, the second reading device 12 on the first reading device 11 is also opened.

In this state, maintenance of the inside of the recording unit 20 is performed. More specifically, by opening the first reading device 11 (opening the scanner unit 10), the user can replace the ink cartridge 243 in the recording unit 20 or remove a jammed sheet S.

In this state, in synchronization with the opening operation in which the first reading device 11 is opened with respect to the body of the recording apparatus 1, in the guiding member 5, the first rotating shafts 51 and the second rotating shaft 52 rotate the first shaft supporting portions 63 and the second shaft supporting portion 64 respectively, and the slide shafts 55 slide upward in the slide guide portions 127 to the upper portion of the first slide guide portions 127a. The position to which the guiding member 5 is moved in synchronization with the opening operation in which the first reading device 11 is opened with respect to the body of the recording apparatus 1 is a retracted position in which the first reading device 11 is opened with respect to the body of the recording apparatus 1.

In this state, the lower guiding portion 50b of the guiding member 5 is positioned with a space substantially in parallel with a rear surface 111a of an outer case 111 of the first reading device 11, and the upper guiding portion 50a of the guiding member 5 is positioned with a space substantially in parallel with the side surface 126c of the guiding member installation section 126 of the outer case 125 of the second reading device 12. The space when the guiding member 5 is in the retracted position is narrower than the space when the guiding member 5 is in the retracted position illustrated in FIG. 7. The guiding member 5, however, does not interfere with components around the guiding member 5 including the rear surface 111a and the side surface 126c. In other words, when the first reading device 11 is opened with respect to the body of the recording apparatus 1, the guiding member 5 is accommodated in the space defined by the rear surface 111a, the side surface 126c, and the sheet feed tray 30.

In the scanner unit 10, when the second reading device 12 is opened with respect to the first reading device 11, a thick document is mounted on the exposed document mounting surface of the first reading device 11, and the second reading device 12 is closed, the second reading device 12 is moved upward. In such a case, as the second reading device 12 moves upward, the slide shafts 55 of the guiding member 5 slide in the second slide guide portions 127b in the slide guide portions 127. With this structure, when a thick document is mounted on the document mounting surface of the first reading device 11, the guiding position of the guiding member 5 can be ensured.

Figure 9:
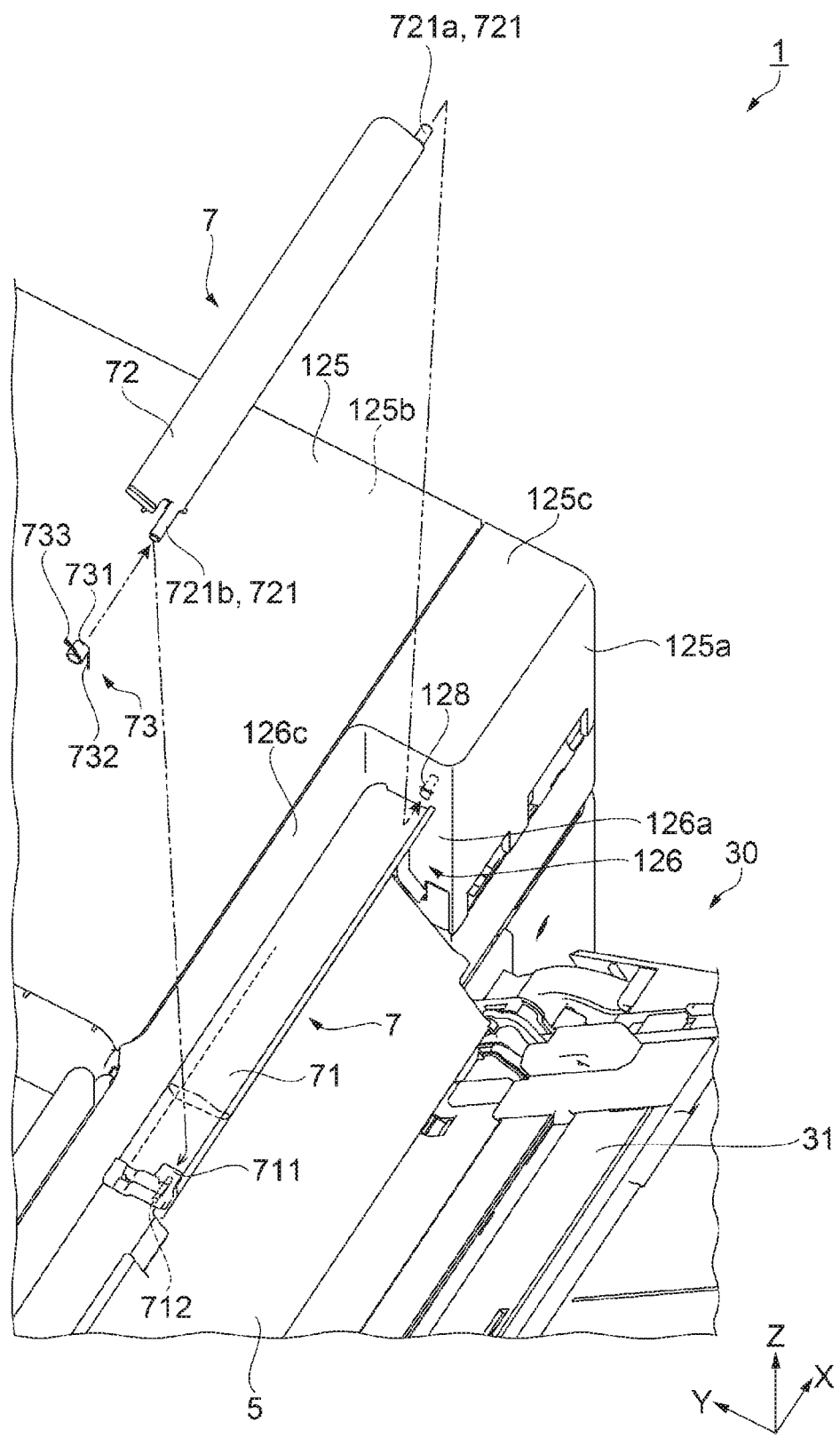
FIG. 9 is an exploded perspective view illustrating a catcher.

Next, the catcher 7 according to the embodiment will be described. FIG. 9 is an exploded perspective view illustrating the catcher 7. The above-mentioned FIG. 4 is also a cross-sectional view illustrating the catcher 7 in a state in which the first reading device 11 and the second reading device 12 are closed with respect to the body of the recording apparatus 1 in a state in which the sheet feeding device 3 is extended.

The catcher 7 according to the embodiment includes, as illustrated in FIG. 9 and FIG. 4, a receiving member 71, an auxiliary member 72, and a spring member 73 as main components. In the outer case 125 of the second reading device 12, the catcher 7 extends from an upper portion of the side surface 126c of the guiding member installation section 126 toward the rear surface side in side view. In top view, on a rear surface side of an upper surface 125c of the outer case 125, the catcher 7 extends from a right side end portion of the upper surface 125c to the side surface 126a of the guiding member installation section 126 in the width direction.

On the rear surface side of the upper surface 125c of the outer case 125, the receiving member 71 extends from the side surface 126c of the guiding member installation section 126 that corresponds to the right side end portion of the upper surface 125c to the side surface 126a of the guiding member installation section 126 in the width direction, and protrudes toward the rear surface side. The receiving member 71 is disposed at a position higher than the position at which the guiding member 5 is installed. FIG. 9 illustrates the cross section of the receiving member 71 by broken line.

The rectangular plate-shaped auxiliary member 72 faces the receiving member 71, and in the auxiliary member 72, the width direction is a long-side direction, and the height direction is a short-side direction. At both end portions in the width direction of a lower portion of the auxiliary member 72, auxiliary rotating shafts 721 that are a pair of rotating shafts that coaxially protrude in the width direction are provided. The auxiliary rotating shafts 721 includes a left-side auxiliary rotating shaft 721a that is the auxiliary rotating shaft 721 on the left side, and a right-side auxiliary rotating shaft 721b that is the auxiliary rotating shaft 721 on the right side.

The side surface 126a of the guiding member installation section 126 has, to correspond to the left-side auxiliary rotating shaft 721a, a left-side auxiliary shaft supporting portion 128 that turnably supports the left-side auxiliary rotating shaft 721a. At a right end portion of the receiving member 71, a protrusion 711 that protrudes upward is formed. The protrusion 711 has a right-side auxiliary shaft supporting portion 712 that turnably supports the right-side auxiliary rotating shaft 721b of the auxiliary member 72. The left-side auxiliary shaft supporting portion 128 and the right-side auxiliary shaft supporting portion 712 are a pair of shaft supporting portions that pivotally support a pair of auxiliary rotating shafts 721.

A spring member 73 is a torsion coil spring. The spring member 73 includes a coil portion 731, an arm portion 732 the extends from one end portion of the coil portion 731, and another arm portion 733 that extends the other end portion of the coil portion 731.

A procedure for inserting the right-side auxiliary rotating shaft 721b of the auxiliary member 72 into the right-side auxiliary shaft supporting portion 712 in the protrusion 711 of the receiving member 71 will be described. First, the coil portion 731 of the spring member 73 is put on the right-side auxiliary rotating shaft 721b, one arm portion 732 is inserted into a fixing hole (not illustrated) in the receiving member 71, and the other arm portion 733 is fixed to an inner surface side (a surface side that faces the receiving member 71) of the auxiliary member 72. With this structure, the spring member 73 extends between the auxiliary member 72 and the receiving member 71 about the right-side auxiliary rotating shaft 721b.

Then, in this state, the right-side auxiliary rotating shaft 721b is inserted into the right-side auxiliary shaft supporting portion 712. Furthermore, the left-side auxiliary rotating shaft 721a of the auxiliary member 72 is inserted into the left-side auxiliary shaft supporting portion 128 in the side surface 126a of the guiding member installation section 126. By the procedure, based on the receiving member 71, the spring member 73 and the auxiliary member 72 are assembled into the catcher 7.

In the catcher 7, the auxiliary member 72 is turnably coupled to the receiving member 71 with the spring member 73. The spring member 73 urges the auxiliary member 72 with respect to the receiving member 71 in a direction to open the auxiliary member 72. In a state in which the sheet feeding device 3 is extended, the auxiliary member 72 of the catcher 7 is opened with respect to the receiving member 71 by the urging force of the spring member 73, and the catcher 7 protrudes in the height direction with respect to the upper surface 125c of the second reading device 12.

The above-mentioned FIG. 7 is also a cross-sectional view illustrating a state of the catcher 7 in a state in which the second reading device 12 is open with respect to the first reading device 11 (open with respect to the body of the recording apparatus 1) in a state in which the sheet feeding device 3 is extended. A movement of an object P that is mounted on the upper surface 125c of the second reading device 12 when the second reading device 12 in FIG. 7 is opened with respect to the body of the recording apparatus 1 from the state illustrated in FIG. 4 in which the second reading device 12 and the first reading device 11 are closed with respect to the body of the recording apparatus 1 will be described. In FIG. 7, the object P is indicated by chain double-dashed line.

When the second reading device 12 is opened with respect to the body of the recording apparatus 1, the object P that is mounted on the upper surface 125c of the second reading device 12 slides or rolls on the upper surface 125c toward the rear surface side, and falls downward from the end portion of the upper surface 125c on the rear surface side. The falling object P, depending on the speed of opening the second reading device 12 and the material of the object P, will directly fall onto the receiving member 71 and be caught, or will come into contact with the auxiliary member 72 that is open with respect to the receiving member 71 and be caught by the receiving member 71.

The auxiliary member 72 comes into contact with the object P that slides down or rolls down the upper surface 125c and thereby assists the receiving member 71 in catching the object P. The auxiliary member 72 that protrudes with respect to the upper surface 125c in the height direction can reliably catch a falling object P, and can catch an object P of a certain size.

The above-mentioned FIG. 8 is also a cross-sectional view illustrating a state of the catcher 7 in a state in which the first reading device 11 is open with respect to the body of the recording apparatus 1 in a state in which the sheet feeding device 3 is extended. As illustrated in FIG. 8, when the first reading device 11 is open with respect to the body of the recording apparatus 1, similarly to the above-described case, in the catcher 7, the object P (see FIG. 7) that is mounted on the upper surface 125c of the second reading device 12 slides down or rolls down the upper surface 125c and is caught by the receiving member 71.

The catcher 7 catches the object P with the cooperating receiving member 71 and auxiliary member 72. The operation of the catcher 7 prevents the object P that is mounted on the upper surface 125c from entering the inside of the sheet feeding device 3 and causing electrical or mechanical failure.

Figure 10:
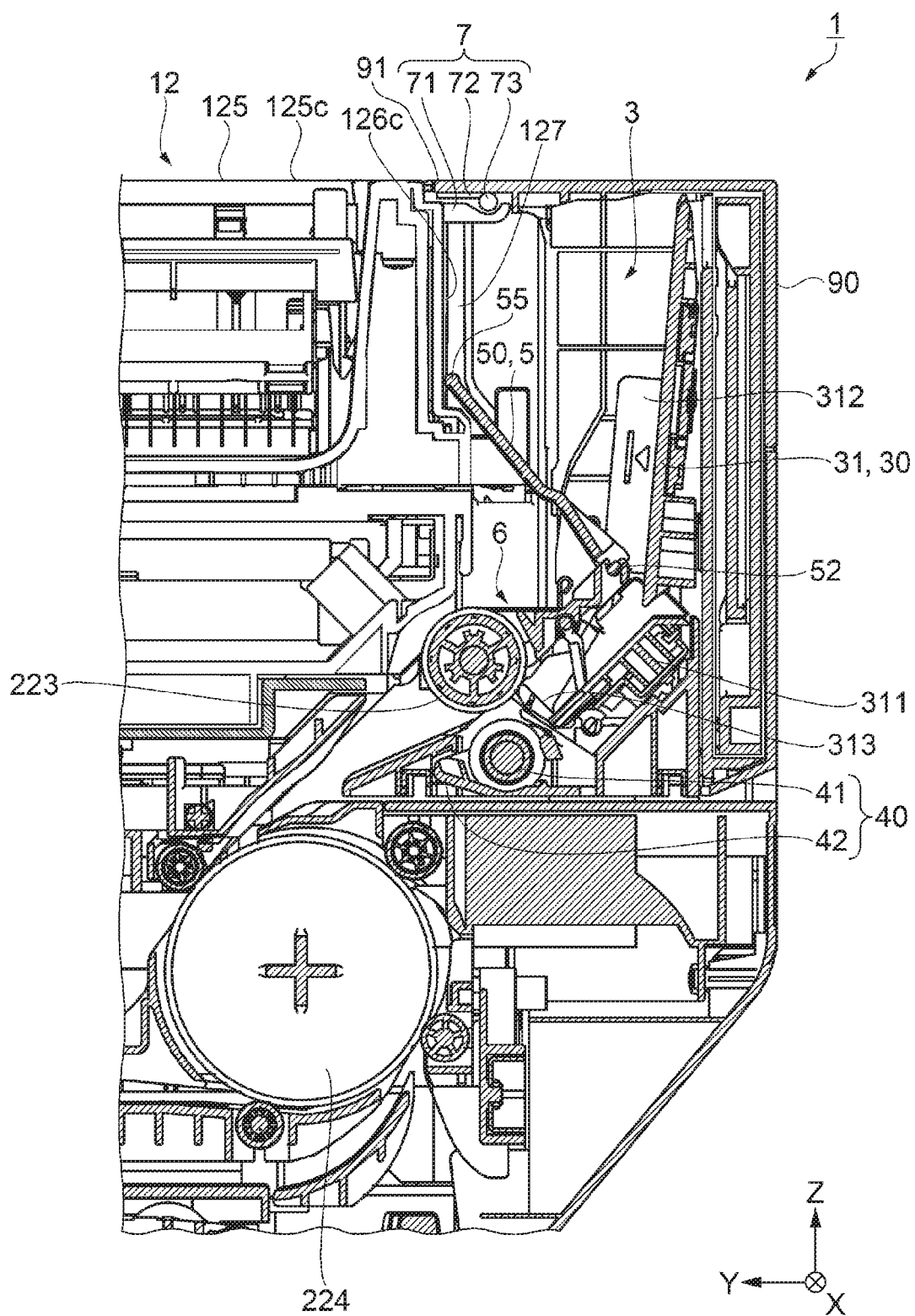
FIG. 10 is a cross-sectional view illustrating the guiding member and the catcher in a state in which the feeding device is closed in a state in which the first reading device and the second reading device are closed with respect to the body of the recording apparatus.

FIG. 10 is a cross-sectional view illustrating the guiding member 5 and the catcher 7 in a state in which the sheet feeding device 3 is closed in a state in which the first reading device 11 and the second reading device 12 are closed with respect to the body of the recording apparatus 1.

To close the sheet feeding device 3 as illustrated in FIG. 10 from a state in which the sheet feeding device 3 is open, first, the fourth support section 34 to the second support section 32 of the extended sheet feed tray 30 are retracted into the first support section 31 as described above. Then, the tray cover 90 is pushed toward the front surface side to turn the tray cover 90 toward the front surface side about a shaft (not illustrated). As the tray cover 90 turns, the first support section 31 other than the hopper 311 turns toward the front surface side about a shaft (not illustrated). By the movement, as illustrated in FIG. 10, the tray cover 90 covers the first support section 31 that accommodates the second support section 32 to the fourth support section 34, and an end portion 91 of the tray cover 90 is fixed to the upper surface 125c of the outer case 125 on the rear surface side.

In this state, the guiding member 5 is in a position similar to the position illustrated in FIG. 4 in which the tray cover 90 is turned toward the rear side and the first support section 31 is positioned at a predetermined angle to enable sheets S to be mounted in an inclined orientation.

As described above, when the tray cover 90 is turned toward the front surface side, the end portion 91 of the tray cover 90 comes into contact with the rear surface side of the upper portion of the auxiliary member 72 of the catcher 7, and against the urging force of the spring member 73, the auxiliary member 72 is pressed toward the front surface side and turned.

By the operation, the auxiliary member 72 is positioned under the end portion 91 of the tray cover 90 as illustrated in FIG. 10. In other words, when the sheet feed tray 30 is turned and close the sheet feed slot 31A as the tray cover 90 is turned, the auxiliary member 72 comes into contact with the turning tray cover 90, and is turned against the urging force of the spring member 73 toward the receiving member 71 side. When the tray cover 90 is turned toward the rear surface side from the state illustrated in FIG. 10 to open the sheet feeding device 3, the auxiliary member 72 is opened by the urging force of the spring member 73 as illustrated in FIG. 4.

According to the embodiment, the following advantages can be achieved.

The recording apparatus 1 according to the embodiment includes the sheet feeding device 3 that has the sheet feed tray 30 on which sheets S are mounted in an inclined orientation, the third feeding roller 223 that feeds the sheets S, and the sheet feed slot 31A that is defined by the sheet feed tray 30 and the third feeding roller 223 and into which the sheets S are set, and the recording section 24 that performs recording onto the sheets S fed from the sheet feeding device 3. The recording apparatus 1 includes the scanner unit 10 that is disposed on the body of the recording apparatus 1 and functions as a reading device for reading a document, and the guiding member 5 that has the rear surface 50d that is the inclined surface inclined downward below a horizontal plane toward the sheet feed tray 30 from the side surface 126c of the guiding member installation section 126 that is the side surface of the scanner unit 10 on the sheet feed tray 30 side when sheets S are mounted onto the sheet feed tray 30 in a state in which the scanner unit 10 is closed with respect to the body of the recording apparatus 1. With the guiding member 5 that has the rear surface 50d that is the inclined surface inclined downward below a horizontal plane toward the sheet feed tray 30 from the side surface 126c of the scanner unit 10 on the sheet feed tray 30 side, when the user sets sheets S in a state in which the user cannot see the sheet feed slot 31A, the sheets S are guided along the rear surface 50d of the guiding member 5 toward the sheet feed tray 30. With the structure, typical problems such as being caught by uneven portions on a side surface of a reading device on a sheet feed tray side can be reduced, and the sheets S can be properly mounted onto the sheet feed tray 30. Accordingly, when sheets S are set onto the sheet feed tray 30, the sheets S can be more reliably set.

In the recording apparatus 1 according to the embodiment, the guiding member 5 includes the rectangular guiding plate 50 that has a dimension that is substantially the same as the width of the sheet feed slot 31A in the width direction in which the sheet feed slot 31A extends, the first rotating shafts 51 that are formed at both end portions in the width direction on the lower side of the guiding plate 50 and have the axis direction in the width direction, and the slide shafts 55 that are formed at both end portions in the width direction on the upper side and have the axis in the width direction. In the second reading device 12 of the scanner unit 10, on the sheet feed tray 30 side of the second reading device 12, the slide guide portions 127 that allow the slide shafts 55 to slide in the vertical direction are provided. The guiding member 5 rotates about the first rotating shafts 51 and the slide shafts 55 slide along the slide guide portions 127 and thus the guiding member 5 moves to the retracted position in synchronization with an operation of opening the scanner unit 10 and moves to the guiding position in which the inclined surface (rear surface 50d) is positioned toward the sheet feed tray 30 in synchronization with a closing operation. As described above, in synchronization with an operation (opening operation) of moving the scanner unit 10 from a closed state to an open state, the guiding member 5 turns about the first rotating shafts 51 and the slide shafts 55 vertically slide along the slide guide portions 127, and thereby the position of the guiding member 5 is moved and changed to the retracted position. In contrast, in synchronization with an operation (closing operation) of moving the scanner unit 10 from an open state to a closed state, the guiding member 5 turns about the first rotating shafts 51 and the slide shafts 55 vertically slide along the slide guide portions 127, and thereby the position of the guiding member 5 is moved and changed to the guiding position in which the inclined surface (rear surface 50d) is positioned toward the sheet feed tray 30. With this structure, in the guiding position, the guiding member 5 enables sheets S to be properly mounted on the sheet feed tray 30, and thus sheets S can be properly set to the sheet feed slot 31A and the sheets S can be more reliably set to the sheet feed tray 30. In the retracted position, the guiding member 5 does not come into contact with (not interfere with) other components, and thus the compact guiding member 5 can be provided and an increase in size of the sheet feeding device 3 can be prevented.

The recording apparatus 1 according to the embodiment includes the roller shaft 223A that extends in the width direction to pivotally support the third feeding roller 223 to rotate the third feeding roller 223, and the cover member 6 that extends in the width direction and cover the roller shaft 223A. The guiding member 5 includes the second rotating shaft 52 that is coaxial with the first rotating shafts 51 that are provided at both end portions of the guiding plate 50 in the width direction and is disposed between the first rotating shafts 51. The cover member 6 includes the first shaft supporting portions 63 that pivotally support the first rotating shafts 51 and the second shaft supporting portion 64 that pivotally supports the second rotating shaft 52. As described above, the cover member 6 includes the first shaft supporting portions 63 that pivotally support the first rotating shafts 51 and the second shaft supporting portion 64 that pivotally supports the second rotating shaft 52. With this structure, in the slide guide portions 127 of the second reading device 12, the guiding member 5, and the cover member 6, by the operations such as the engagement between the slide guide portions 127 and the slide shafts 55, the engagement between the first rotating shafts 51 and the first shaft supporting portions 63, and the engagement between the second rotating shaft 52 and the second shaft supporting portion 64, bending in the direction of gravity in the cover member 6, which extends in the width direction and cover the roller shaft 223A, can be prevented, and the rigidity can be increased. Accordingly, for example, it can be prevented that insufficient rigidity of the cover member 6 causes the cover member 6 to bend and comes into contact with the roller shaft 223A, interfering with the rotation or producing abnormal noise. Furthermore, with this structure, the lightweight cover member 6 can be provided.

In the recording apparatus 1 according to the embodiment, the insertion portion 31B into which sheets S are inserted is defined between the sheet feed tray 30 and the lower end portion of the guiding plate 50. With this structure, when the user mounts sheets S onto the sheet feed tray 30, after the sheets S are guided by the guiding plate 50, the sheets S are inserted via the insertion portion 31B, and thus the sheets S can be readily mounted on the sheet feed tray 30.

In the recording apparatus 1 according to the embodiment, on the sheet feed tray 30 side of the second reading device 12, the catcher 7 that prevents an object P that is mounted on the upper surface 125c of the second reading device 12 from entering the sheet feeding device 3 is provided. The catcher 7 includes the receiving member 71 that extends in the width direction and receives an object P, the auxiliary member 72 that is turnably coupled to the receiving member 71 and protrudes in the height direction with respect to the upper surface 125c of the second reading device 12 and assists the receiving member 71 in catching the object P, and the spring member 73 that urges the auxiliary member 72 with respect to the receiving member 71 in a direction to open the auxiliary member 72. The catcher 7 includes the auxiliary member 72 that protrudes in the height direction with respect to the upper surface 125c of the second reading device 12, and as compared with a case in which the auxiliary member 72 does not protrude in the height direction with respect to the upper surface 125c, when the second reading device 12 is opened and inclined, the catcher 7 can more readily catch the object P on the upper surface 125c. Furthermore, the catcher 7 includes the spring member 73 that urges the auxiliary member 72 with respect to the receiving member 71 in a direction to open the auxiliary member 72. With this structure, when something comes into contact with the auxiliary member 72 and the auxiliary member 72 is pushed in the closing direction, the spring member 73 always urges the auxiliary member 72 in the opening direction, and thus the spring member 73 can open the auxiliary member 72 to the maximum within the range, and the catcher 7 can catch the object P.

In the recording apparatus 1 according to the embodiment, the tray cover 90 is provided. As the tray cover 90 is turned with respect to the body of the recording apparatus 1, the sheet feed tray 30 is turned to cover the sheet feed slot 31A. The auxiliary member 72 includes a pair of auxiliary rotating shafts 721 that have the axis direction in the width direction with respect to the receiving member 71. The receiving member 71 includes a pair of shaft supporting portions (left-side auxiliary shaft supporting portion 128, right-side auxiliary shaft supporting portion 712) that pivotally support a pair of auxiliary rotating shafts 721. The spring member 73 extends between the auxiliary member 72 and the receiving member 71 about the right-side auxiliary rotating shaft 721b. When the sheet feed tray 30 is turned as the tray cover 90 is turned to cover the sheet feed slot 31A, the auxiliary member 72 comes into contact with the turning tray cover 90, and is turned against the urging force of the spring member 73 toward the receiving member 71 side. With this structure, the catcher 7 can prevent the object P from entering the sheet feeding device 3, and when covering the sheet feed slot 31A, the auxiliary member 72 is turned against the urging force of the spring member 73 toward the receiving member 71 side, and thus the catcher 7 does not outwardly protrude from the upper surface 125c, and the compact catcher 7 can be provided.

2. First Modification

In the recording apparatus 1 according to the embodiment, the guiding plate 50 of the guiding member 5 includes the upper guiding portion 50a, the lower guiding portion 50b, and the bent portion 50c. The structure, however, is not limited to this example, and the guiding plate 50 may be a member that has an inclined surface that is inclined from the side surface on the sheet feed tray 30 side toward the sheet feed tray 30, for example, one flat member or one bent member.

3. Second Modification

In the recording apparatus 1 according to the embodiment, the scanner unit 10 includes two reading devices: the first reading device 11, and the second reading device 12. The scanner unit 10, however, is not limited to this example, and may include one reading device.

Contents derived from the embodiment and modifications will be described below.

A recording apparatus includes a sheet feeding device including a sheet feed tray on which a medium is mounted in an inclined orientation, a feeding roller configured to feed the medium, and a sheet feed slot that is defined by the sheet feed tray and the feeding roller and into which the medium is set, and a recording section configured to perform recording onto the medium fed from the sheet feeding device. The recording apparatus includes a reading device disposed on a body of the recording apparatus, the reading device being configured to read a document and to expose the inside of the recording apparatus, and a guiding member having an inclined surface inclined downward below a horizontal plane toward the sheet feed tray from a side surface of the reading device on the sheet feed tray side in a state in which the reading device is closed with respect to a body of the recording apparatus.

This structure includes a guiding member having an inclined surface inclined downward below a horizontal plane toward the sheet feed tray from a side surface of the reading device on the sheet feed tray side of the reading device. Accordingly, when the medium is set in a state in which the user cannot see the sheet feed slot, the medium is guided along the inclined surface of the guiding member toward the sheet feed tray. With the structure, typical problems such as being caught by uneven portions on the side surface of the reading device on the sheet feed tray side can be reduced, and the medium can be properly mounted onto the sheet feed tray. Accordingly, when a medium is set onto the sheet feed tray, the medium can be more reliably set.

In the recording apparatus, the guiding member may include a rectangular guiding plate having a dimension that is substantially the same as a width of the sheet feed slot in a width direction in which the sheet feed slot extends, first rotating shafts formed at both end portions in the width direction on a lower side of the guiding plate, the first rotating shafts having an axis direction in the width direction, and slide shafts formed at the end portions on an upper side, the slide shafts having an axis in the width direction. The recording apparatus may further include slide guide portions configured to slide the slide shafts in a vertical direction, the slide guide portions formed in a side surface of the reading device on the sheet feed tray side, and the guiding member is configured to rotate about the first rotating shafts and the slide shafts slide along the slide guide portions to move to a retracted position in synchronization with an operation of opening the reading device and move to a guiding position in which the inclined surface is positioned toward the sheet feed tray in synchronization with a closing operation.

In this structure, in synchronization with an operation (opening operation) of moving the reading device from a closed state to an open state, the guiding member turns about the first rotating shaft, and the slide shafts vertically slide along the slide guide portions, and thereby the position of the guiding member is moved and changed to the retracted position. In contrast, in synchronization with an operation (closing operation) of moving the reading device from an open state to a closed state, the guiding member turns about the first rotating shaft, and the slide shafts vertically slide along the slide guide portions, and thereby the position of the guiding member is moved and changed to the guiding position in which the inclined surface is positioned toward the sheet feed tray. With this structure, in the guiding position, the medium can be properly mounted onto the sheet feed tray, and thus medium can be properly set to the sheet feed slot and the medium can be more reliably set to the sheet feed tray. In the retracted position, the guiding member does not come into contact with other components, and thus the compact guiding member can be provided and an increase in size of the sheet feeding device can be prevented.

The recording apparatus may further include a roller shaft extending in the width direction to pivotally support the feeding roller to rotate the feeding roller, and a cover member extending in the width direction to cover the roller shaft, in which the guiding member may further include a second rotating shaft that is coaxial with the first rotating shafts formed at the end portions of the guiding plate in the width direction and is disposed between the first rotating shafts, and the cover member may include first shaft supporting portions that pivotally support the first rotating shafts and a second shaft supporting portion that pivotally supports the second rotating shaft.

With the structure in which the cover member includes first shaft supporting portions that pivotally support the first rotating shafts and a second shaft supporting portion that pivotally supports the second rotating shaft, in the slide guide portions of the second reading device, the guiding member, and the cover member, by the operations such as the engagement between the slide guide portions and the slide shafts, the engagement between the first rotating shafts and the first shaft supporting portions, and the engagement between the second rotating shaft and the second shaft supporting portion, bending in the direction of gravity in the cover member, which extends in the width direction and cover the roller shaft, can be prevented, and the rigidity can be increased. Accordingly, for example, it can be prevented that insufficient rigidity of the cover member causes the cover member to bend and comes into contact with the roller shaft, interfering with the rotation or producing abnormal noise. Furthermore, with this structure, the lightweight cover member can be provided.

In the recording apparatus, an insertion portion into which the medium is inserted may be defined between the sheet feed tray and a lower end portion of the guiding plate.

With this structure, when the user mounts a medium onto the sheet feed tray, after the medium is guided by the guiding plate, the medium is inserted via the insertion portion, and thus the medium can be readily mounted onto the sheet feed tray.

The recording apparatus may further include a catcher configured to prevent an object that is mounted on an upper surface of the reading device from entering the sheet feeding device, the catcher being disposed on the sheet feed tray side of the reading device, in which the catcher may include a receiving member that extends in the width direction and receives the object, an auxiliary member that is turnably coupled to the receiving member, protrudes in a height direction with respect to the upper surface of the reading device, and assists the receiving member in catching the object, and a spring member that urges the auxiliary member with respect to the receiving member in a direction to open the auxiliary member.

With this structure, an auxiliary member that protrudes in a height direction with respect to the upper surface of the reading device is provided. As compared with a case in which the auxiliary member does not protrude in the height direction with respect to the upper surface, when the reading device is opened and inclined, the object on the upper surface can be more readily caught. Furthermore, a spring member that urges the auxiliary member with respect to the receiving member in a direction to open the auxiliary member is provided. With this structure, when something comes into contact with the auxiliary member and the auxiliary member is pushed in the closing direction, the spring member always urges the auxiliary member in the opening direction, and thus the spring member can open the auxiliary member to the maximum within the range, and the catcher can catch the object.

The recording apparatus may further include a tray cover configured to be turned with respect to the body of the recording apparatus to cause the sheet feed tray to be turned together with the tray cover to cover the sheet feed slot, in which the auxiliary member may include a pair of rotating shafts that has an axis direction in the width direction with respect to the receiving member, the receiving member may include a pair of shaft supporting portions that pivotally support the pair of rotating shafts, the spring member may extend between the auxiliary member and the receiving member about one of the rotating shafts, and when the sheet feed tray is turned as the tray cover is turned to cover the sheet feed slot, the auxiliary member may come into contact with the turning tray cover, and may be turned against the urging force of the spring member toward the receiving member side.

With this structure, the catcher can prevent the object from entering the sheet feeding device, and when covering the sheet feed slot, the auxiliary member is turned against the urging force of the spring member toward the receiving member side, and thus the catcher does not outwardly protrude from the upper surface, and the compact catcher can be provided.

What is claimed is:

1. A recording apparatus comprising a sheet feeding device including a sheet feed tray on which a medium is mounted in an inclined orientation, a feeding roller configured to feed the medium, and a sheet feed slot that is defined by the sheet feed tray and the feeding roller, and a recording section configured to perform recording onto the medium fed from the sheet feeding device, the recording apparatus comprising:
   a reading device disposed on a body of the recording apparatus, the reading device being configured to read a document and to expose inside of the recording apparatus; and
   a guiding member inclined downward below a horizontal plane from a side surface of the reading device on sheet feed tray side in a state in which the reading device is closed with respect to a body of the recording apparatus, wherein the guiding member is configured to move to a retracted position in synchronization with an operation of opening the reading device and move to a guiding position in which an inclined surface is positioned toward the sheet feed tray in synchronization with a closing operation.

2. The recording apparatus according to claim 1, wherein the guiding member comprises:
   a rectangular guiding plate having a dimension that is substantially same as a width of the sheet feed slot in a width direction in which the sheet feed slot extends;
   first rotating shafts formed at both end portions in the width direction on a lower side of the rectangular guiding plate, the first rotating shafts having an axis direction in the width direction; and
   slide shafts formed at the end portions on an upper side, the slide shafts having an axis in the width direction,
   the recording apparatus further comprises slide guide portions configured to slide the slide shafts in a vertical direction, the slide guide portions formed in a side surface of the reading device on the sheet feed tray side, and the guiding member is configured to rotate about the first rotating shafts and the slide shafts slide along the slide guide portions to move to the retracted position and the guiding position.

3. The recording apparatus according to claim 2, further comprising:
a roller shaft extending in the width direction to pivotally support the feeding roller to rotate the feeding roller; and
a cover member extending in the width direction to cover the roller shaft, wherein
the guiding member further comprises a second rotating shaft that is coaxial with the first rotating shafts formed at the end portions of the rectangular guiding plate in the width direction and is disposed between the first rotating shafts, and
the cover member comprises first shaft supporting portions that pivotally support the first rotating shafts and a second shaft supporting portion that pivotally supports the second rotating shaft.

4. The recording apparatus according to claim 2, wherein an insertion portion into which the medium is inserted is defined between the sheet feed tray and a lower end portion of the rectangular guiding plate.

5. The recording apparatus according to claim 1, further comprising:
a catcher configured to prevent an object that is mounted on an upper surface of the reading device from entering the sheet feeding device, the catcher being disposed on the sheet feed tray side of the reading device, wherein the catcher comprises:
a receiving member that extends in a width direction and receives the object;
an auxiliary member that is turnably coupled to the receiving member, protrudes in a height direction with respect to the upper surface of the reading device, and assists the receiving member in catching the object; and
a spring member that urges, with an urging force, the auxiliary member with respect to the receiving member in a direction to open the auxiliary member.

6. The recording apparatus according to claim 5, further comprising:
a tray cover configured to be turned with respect to the body of the recording apparatus to cause the sheet feed tray to be turned together with the tray cover to cover the sheet feed slot, wherein
the auxiliary member comprises a pair of rotating shafts that has an axis direction in the width direction with respect to the receiving member,
the receiving member comprises a pair of shaft supporting portions that pivotally support the pair of rotating shafts,
the spring member extends between the auxiliary member and the receiving member about one of the pair of rotating shafts, and
when the sheet feed tray is turned as the tray cover is turned to cover the sheet feed slot, the auxiliary member comes into contact with the tray cover, and is turned against the urging force of the spring member toward the receiving member side.

* * * * *